United States Patent [19]

Marchand

[11] Patent Number: 5,726,438
[45] Date of Patent: Mar. 10, 1998

[54] LUMINOUS FLUX MEASURING DEVICE WITH A GAIN-CONTROLLING SLAVE CIRCUIT ENABLING THE DEVICE TO RAPIDLY ADAPT TO CHANGES IN FLUX

[75] Inventor: Alain Le Marchand, Le Mesnil, France

[73] Assignee: Instruments S.A., Paris, France

[21] Appl. No.: 683,021

[22] Filed: Jul. 15, 1996

Related U.S. Application Data

[63] Continuation of Ser. No. 327,060, Oct. 21, 1994, abandoned.

[30] Foreign Application Priority Data

Oct. 21, 1993 [FR] France ................... 93 12585

[51] Int. Cl.⁶ ..................... H01J 40/14; H01J 39/12
[52] U.S. Cl. ..................... 250/207; 250/214 AG; 250/214 VT; 313/532
[58] Field of Search ............ 250/214 AG, 214 VT, 250/207, 206; 313/532, 533, 534, 535, 536, 537

[56] References Cited

U.S. PATENT DOCUMENTS

| | | |
|---|---|---|
| 3,487,222 | 12/1969 | Martens ................... 250/214 AG |
| 3,600,072 | 8/1971 | Skagerlund . |
| 3,714,441 | 1/1973 | Kreda ................... 250/207 |
| 4,105,967 | 8/1978 | Macemon . |
| 4,669,877 | 6/1987 | Wittmer . |
| 4,987,298 | 1/1991 | Inagaki ................... 250/214 AG |

FOREIGN PATENT DOCUMENTS

| | | |
|---|---|---|
| 0346878 | 12/1989 | European Pat. Off. . |
| 8302323 | 7/1983 | WIPO . |

OTHER PUBLICATIONS

Review of Scientific Instruments, vol. 51, No. 11, Nov. 1980, New York, NY, USA, pp. 1500-1503 H. Hayashi et al. 'Dual-variable detection method providing a wider dynamic range to a photomultiplier'.

*Primary Examiner*—Stephone Allen
*Attorney, Agent, or Firm*—Handal & Morofsky

[57] ABSTRACT

A luminous flux measuring device has a gain slaving circuit (10, 9), that receives an electrical output signal (m) produced by a photoreceiver (1) and includes a gain control circuit (9) and a comparator (10). The gain slaving circuit is connected to an A/D converter and a computer to record and evaluate the signal (m) and has a slave memory containing characteristic values (a,b) of a continuous function (f). The gain slaving circuit produces a slave signal (HT) according to the flux received ($\Phi$) by the photoreceiver which signal is sent to the gain control circuit so that G=f(m).

15 Claims, 6 Drawing Sheets

LUMINOUS FLUX MEASURING DEVICE WITH A GAIN-CONTROLLING SLAVE CIRCUIT ENABLING THE DEVICE TO RAPIDLY ADAPT TO CHANGES IN FLUX

This application is a Continuation of application Ser. No. 08/327,060, filed 21 Oct. 1994, now abandoned.

BACKGROUND OF THE INVENTION

1. Field of the Invention

This invention relates to a luminous flux measuring device usable for any instrument comprising such a device, and particularly for measurements in spectrometry, polarimetry and diffusiometry.

2. Background Information

The measurement of luminous flux can be performed by devices based on widely-differing principles of physics, including, for example, photographic emulsions, photomultipliers, scanning tubes and photodiodes, possibly in arrays, vidicon tubes, CCD (charge-coupled devices) and CID (charge-injected devices) detectors.

The choice of a detection system depends on the particular conditions of the measurement to be taken, and in particular on the measuring speed sought and the measurement accuracy and dynamic range required.

The final choice is a trade-off between these different physical parameters, and naturally takes into account the cost of the available systems.

In particular, many spectrogrametric measurements call for or use a luminous flux measuring device with a large dynamic range.

For example, spectrometric emission measurements can require several tens of thousands of measurements per second, measurement accuracy of at least 1/4000 and a dynamic range of at least $10^6$.

At the present time, to meet this demand, use is made essentially of photomultipliers whose signals are digitized and then processed by computer to provide the measurements or curves sought.

Dynamic range is therefore limited by the capacity of the analog-to-digital converter that digitizes the signal. An n-bit converter permits a ratio of $2^n$ between the lowest level and maximum level detected.

Advantageous perspectives am opened up by CCD or CID, particularly because these detectors emit practically no current in the absence of received luminous flux, although their intrinsic noise and dynamic range performance necessitate varying integration times that can reach several tens of minutes.

It is also well known that the signal supplied by a photomultiplier depends on the level of the high voltage established between its cathode and anode.

Correctly choosing the value of this high voltage makes it possible to obtain satisfactory accuracy in a limited current domain of the received flux.

The object of the invention is to propose a luminous flux measuring device which has a large dynamic range, without this affecting the accuracy of the measurements it furnishes.

A further object of the invention is to propose such a luminous flux measuring device that allows very rapid taking of measurements.

Yet a further object of the invention is to propose such a luminous flux measuring device at a relatively low cost.

SUMMARY OF THE INVENTION

The invention therefore concerns a luminous flux measuring device comprising a gain-controllable photoreceiver receiving a luminous flux to be measured and supplying an electric signal (m), a circuit for controlling the gain of the photoreceiver, means for recording and evaluating the electric signal supplied by the photoreceiver and producing the measurement sought.

According to the invention, this device comprises a gain slaving circuit receiving a signal (m) produced by the photoreceiver, said gain staving circuit including the gain control circuit and a comparator and being linked to means for recording and evaluating the electric signal supplied by the photoreceiver, said gain slave circuit liable to comprise a slave memory containing the characteristic values of a continuous function f, said gain slave circuit producing a slave signal according to the flux received by the photoreceiver, said slave signal being sent to the gain control circuit in such a way that its gain G=f(m).

In the preferred embodiments, this device of the invention comprises the following characteristics taken in any technically feasible combination:

- the photoreceiver is a photomultiplier whose gain is controlled by the level of a high voltage,
- the gain slaving circuit is an analog circuit,
- the gain slaving circuit is a digital circuit,
- it comprises a current-voltage converter which receives the electric current s from the photoreceiver and produces the voltage m for the gain slaving circuit,
- the function f(m) is a linear function a m+b of the signal (m) produced by the photomultiplier,
- the slave memory comprises two potentiometers determining the values of the parameters a and b of the function f(m),
- the function f(m) is a non-linear function,
- the comparator comprises an amplifier configured as a differential amplifier,
- the comparator comprises an amplifier configured as a summing amplifier,
- the gain control circuit comprises a ballast transistor controlled by a transistor configured as a voltage generator,
- the gain control circuit comprises chopping circuits.

The invention also relates to a spectrometer comprising a luminous flux measuring device of the type defined above.

BRIEF DESCRIPTION OF THE DRAWINGS

An embodiment of the invention will now be described in detail with reference to the attached drawings. In these drawings.

DESCRIPTION OF THE PREFERRED EMBODIMENTS

Figure 1:
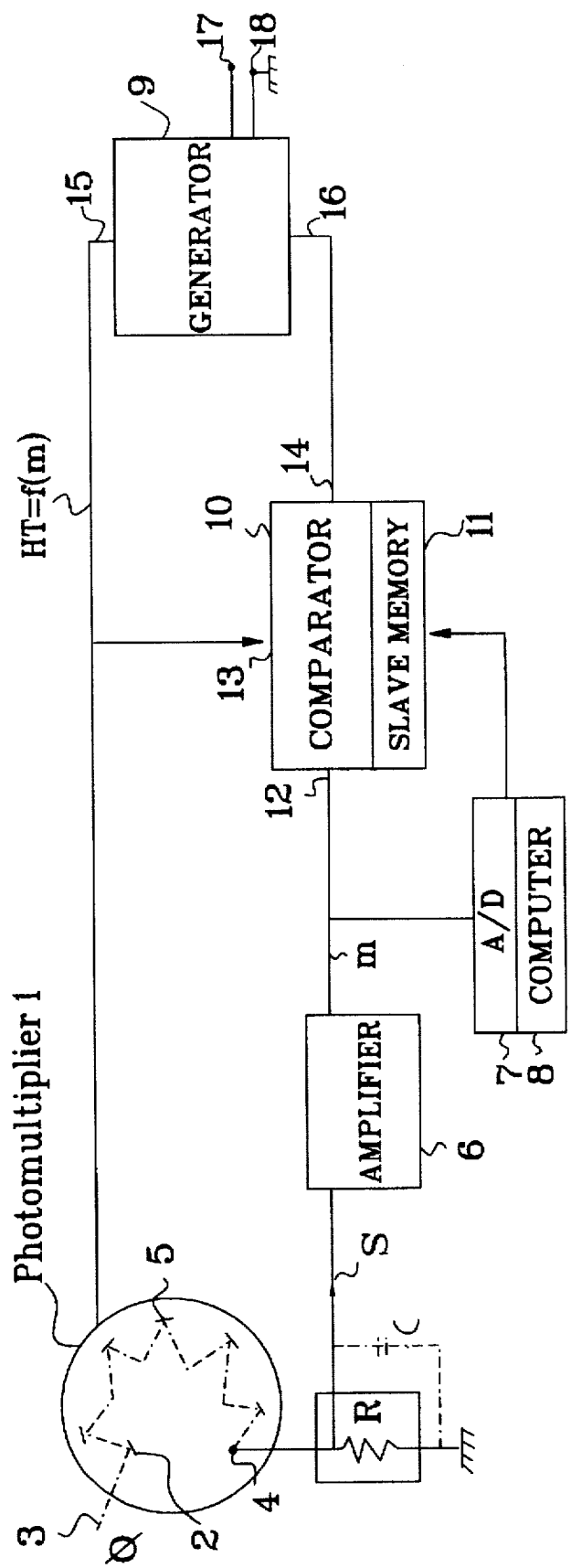
FIG. 1 is an overall block diagram of the device of the invention.

Referring to FIG. 1, photomultiplier 1 traditionally comprises a cathode 2 receiving the luminous flux Φ to measure 3 and emitting the measuring signal s from its anode 4. Dynodes 5 interposed between cathode 2 and anode 4 amplify the current produced by photomultiplier 1.

Signal s is transformed by transconducting amplifier 6 into a voltage m, then digitized by converter 7 and sent to computer 8.

Computer 8 supplies the user with the required measurement in the form required.

A high voltage HT is established by generator 9 between the cathode and anode, and determines the gain of photomultiplier 1, i.e. the ratio between the luminous flux received 3 and the current s produced by photomultiplier 1.

A comparator 10 comprising a slave memory 11 supplies the slave circuit with working parameters, as will be described below.

The slave circuit receives, on its input 12, the signal m supplied by the photomultiplier and, on its input 13, the value of the high voltage. It produces a slave signal on its output 14 which is sent to the high voltage generator 9.

In a conventional way, gain G of photomultiplier 1 can be calculated from the following formula:

$$G=(HT)^{cn}$$

where HT is the potential difference expressed in volts applied between the cathode and anode of photomultiplier 1, c a specific coefficient of the photomultiplier linked to its geometry and the nature of its different components, and n the number of dynodes.

In the present case, the slave loop formed by control circuit 9 and slave circuit 10 makes it possible to control the value of the voltage HT and establish the relationship:

$$HT=f(m)$$

between the high voltage HT and m, where m is the signal supplied after conversion of current s by amplifier 6. The parameters determining function f are contained in memory 11. Computer 8 receives m and uses it and the parameters determining function f to compute flux 3 received by the photomultiplier.

In a preferred embodiment, f(m) is a linear function:

$$HT=a \times m+b$$

where a and b are two parameters contained in slave memory 11 and freely determined by the user.

Figure 2:
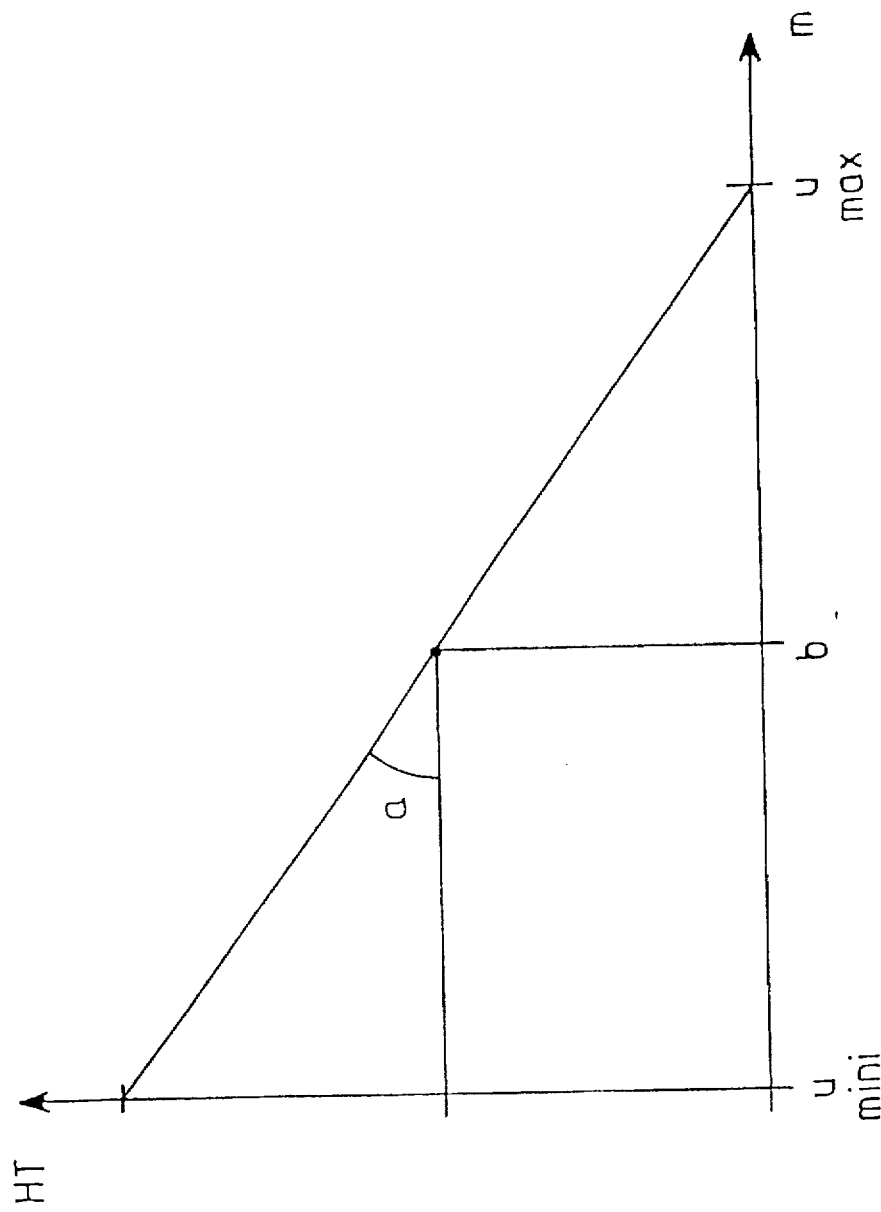
FIG. 2 is a drawing showing the high voltage applied to the photomultiplier as a function of the current level of the luminous flux received.

This variation of the high voltage as a function of signal m is shown in FIG. 2. The high voltage is represented along the y-axis. The signal m, shown along the x-axis, varies between minimum U for minimum luminous flow and maximum U for maximum luminous flow.

For a photomultiplier 1 supplied with negative voltage, a is a positive value number, and b a negative voltage expressed in volts. As indicated above, m is a voltage measured in volts.

Thus, HT varies between a maximum value HT max=b and a minimum value HT min=a×m max+b.

∴ the gain of the photomultiplier is:

$$G=(a \times m+b)^{cn}$$

The transfer function of the measuring device is therefore determined by coefficients a, b and c, which are advantageously determined and modifiable by the user.

The electrical voltage m is equal to:

$$m=G(m)\Phi$$

where G(m) is the gain and Φ the luminous flux received by the photomultiplier.

G0 being the maximum gain (for a minimum measurement m=0):

$$m = \frac{G0}{K(m)} \times \Phi$$

where:

$$K(m) = \frac{G0}{G(m)}$$

It can be shown that:

$$K(M)=(1-\alpha m)^{-\beta}$$

where:

$$\alpha = \frac{HT \min - HT \max}{HT \max \times m \max}$$

and $$\beta = c \times n$$

In one particular embodiment, the following values are chosen:

HTmax=−1000 volts

HTmin=−200 volts which, for the photomultiplier used for which β=8, gives a maximum m measurement=10 V.

$$\therefore \alpha = -\frac{800}{1000} = 0.08$$

and K max=390.625

As already seen, the dynamic range of a conventional luminous flux measuring device, i.e. one in which the signal supplied by the photoreceiver is sent directly to the computer, possibly after amplification, depends on the capacity of the analog-to-digital converter.

Use is conventionally made of a 12-bit analog-to-digital converter which is therefore able to accept 4096 measuring points.

According to the invention, on account of the contribution of the multiplier coefficient K(m), this dynamic range is multiplied by the coefficient K max.

In the case of the digital example given above, this coefficient K=390.625, giving a measurement distributed over $1.6 \times 10^9$ digits. Expressed in lumens, the system is thus able to produce measurements from one picolumen up to several mullilumens continuously.

Of course, in order to supply the measurement, the computer must be able to acquire the α and β values characterizing the working of the gain control system and from which the coefficient K can be found.

These coefficients α and β can be extracted by an iterative computation from reference measurements in the following way:

Two couples of two luminous flux measurements are performed.

For each luminous flux, respectively A and B, a measurement is taken for a maximum value of the high voltage (a=0), and another in the working conditions sought, i.e. with the values a and b representative of f(m) which will ultimately be used. The voltages supplied for the measurement of A being, respectively, U A1 and U A2, and in the same way for the measurement of B, U B1 and U B2, the following equations can be established:

$$(1-\alpha \times U\ B2)-(1-\alpha U\ B1)^x=0$$

obtained after having established:

$$X = 1 + \frac{\log \frac{(UA1 \times UB2)}{(UB1 \times UA2)}}{\log \frac{(UA2)}{(UA1)}}$$

knowing that: $\frac{1}{UB1} > \alpha > 0$ (indeed, with the digital values indicated above, $\alpha$ is in the range 0.06 to 0.1, and X approximately 0.7), since, as seen earlier:

$$\alpha = \frac{HT\min - HT\max}{HT\max \times m\max}$$

given from the numerical values indicated above, HT min being in the range –200 to –300 volts and m max 8 to 10 volts, $$\alpha \min \geq \frac{-300 + 1000}{-1000 \times 10} \geq 097$$

$$\alpha \max \leq \frac{-200 + 1000}{-1000 \times 8} \leq 0.10$$

It is thus possible to limit $\alpha$ to the following values:

$$0.05 \leq \alpha \leq 0.12$$

and $\alpha$ can be used at the nominal value $\alpha=0.085$ to perform an iteration loop.

$$\therefore (1-\alpha \times U\ B2)-(1-\alpha U\ B1)^x=\text{error}.$$

This error tends towards zero as $\alpha$ tends towards its true value.

The iterative computation is interrupted when the absolute value of this error is less than $2.10^{-8}$. $\beta$ can then be found from the following equation:

$$\beta = \frac{\log \frac{(UA2)}{(UA1)}}{\log(1 - \alpha \times UA1)}$$

The particular embodiment of the luminous flux measuring device will now be described, particularly with reference to the drawings in FIG. 3.

Figure 3:
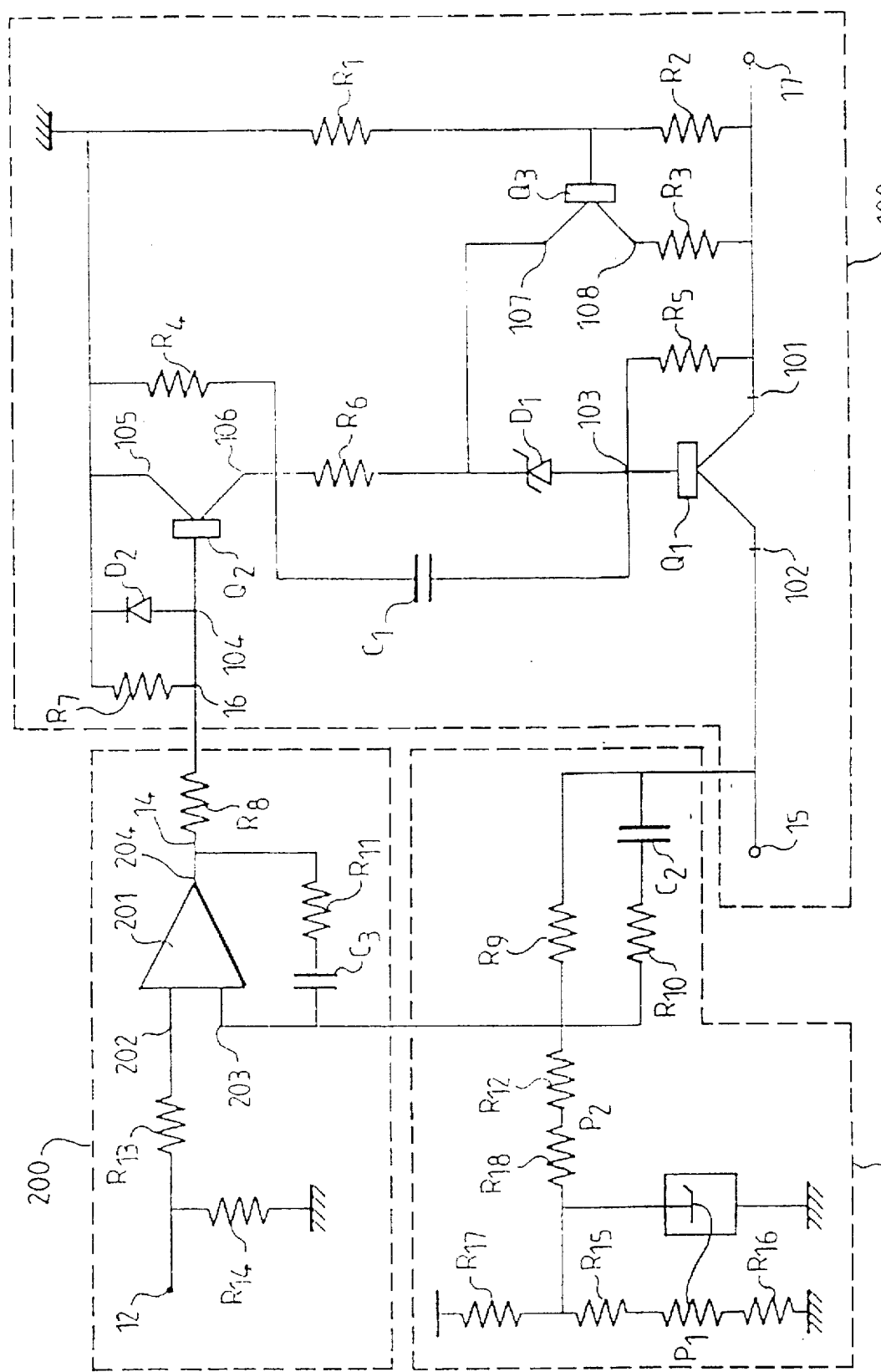
FIG. 3 is a drawing of the slave circuit carried into practice in the invention.

In FIG. 3, assembly 100 is a detailed diagram of a high voltage generator 9, assembly 300 a detailed diagram of slave parameters stored in memory 11, and assembly 200 a detailed representation of comparator 10.

High voltage generator 100 receives, on its input 17, an external high voltage, for example at a level in the range 1020 to 1050 volts at a current level of 0.97 milliamperes.

It receives, on its input 16, the slave command signal originating from comparator 200 and produces, on its output 15, the variable high voltage to which the photomultiplier is connected and whose gain is thus controlled.

Ballast transistor Q1 receives, on its emitter 101, the external, constant level high voltage and provides, via its collector 102, the variable high voltage at 15.

Transistor Q2 receives the signal originating from comparator 102 on its base 104 connected to input 16.

Its emitter 105 is connected to ground and its collector 106 connected to collector 107 of an NPN transistor Q3 whose emitter 108 is connected to emitter 101 of transistor Q1.

Transistor Q3 is therefore configured as a constant current generator, which is needed due to the low voltage that Q2 can withstand in the actual state of available components.

Diode D1, connected, on the one hand, to collector 106 of Q2 and on the other hand, to the base 103 of Q1, increases the adjustment latitude between the base and emitter of Q1.

Diode D2 and resistors R1 to R7 each fill the conventional functions of this type of configuration.

Comparator 200 comprises a differential amplifier 201 configured as a comparator.

It receives signal m on one of its inputs 202 connected to input 12.

It is connected to output 301 of slave memory 300 via its second input 203.

In the example shown, this slave memory 300 comprises two potentiometers, respectively P1 and P2, which are used to determine the parameters a and b of the curve f(m), each approximately corresponding to one of these parameters. Comparator amplifier 201 produces, on its output 204, the slave signal intended for input 16 of voltage control circuit 100.

Resistors R8 to R18 and capacitors C2 and C3 each play customary roles in the operation of the circuits shown.

The cost of the circuit described, and in turn of the luminous flux measuring device, is low, and can be used, as seen above, with an analog-to-digital converter whose size with respect to the dynamic range obtained by this system is comparatively small.

Its response time is rapid and the passage of the high voltage from 250 to 1000 volts, in one direction or the other, can be achieved in approximately 300 µs, the level of this voltage being controlled to an accuracy of 0.1 volt.

This circuit also allows the luminous flux measuring device to operate in conventional conditions, by fixing the value of parameter a at 0, which maintains the high voltage at a constant level equal to b.

In contrast, by giving a a high level, similar to infinity, the measurement is maintained constant at the level b/a and the measurement of the main voltage is then representative of the luminous flux received.

It should also be stressed that this device therefore makes best use of the photomultiplier by rapidly adapting its high voltage to the incident luminous flux detected.

Figure 4:
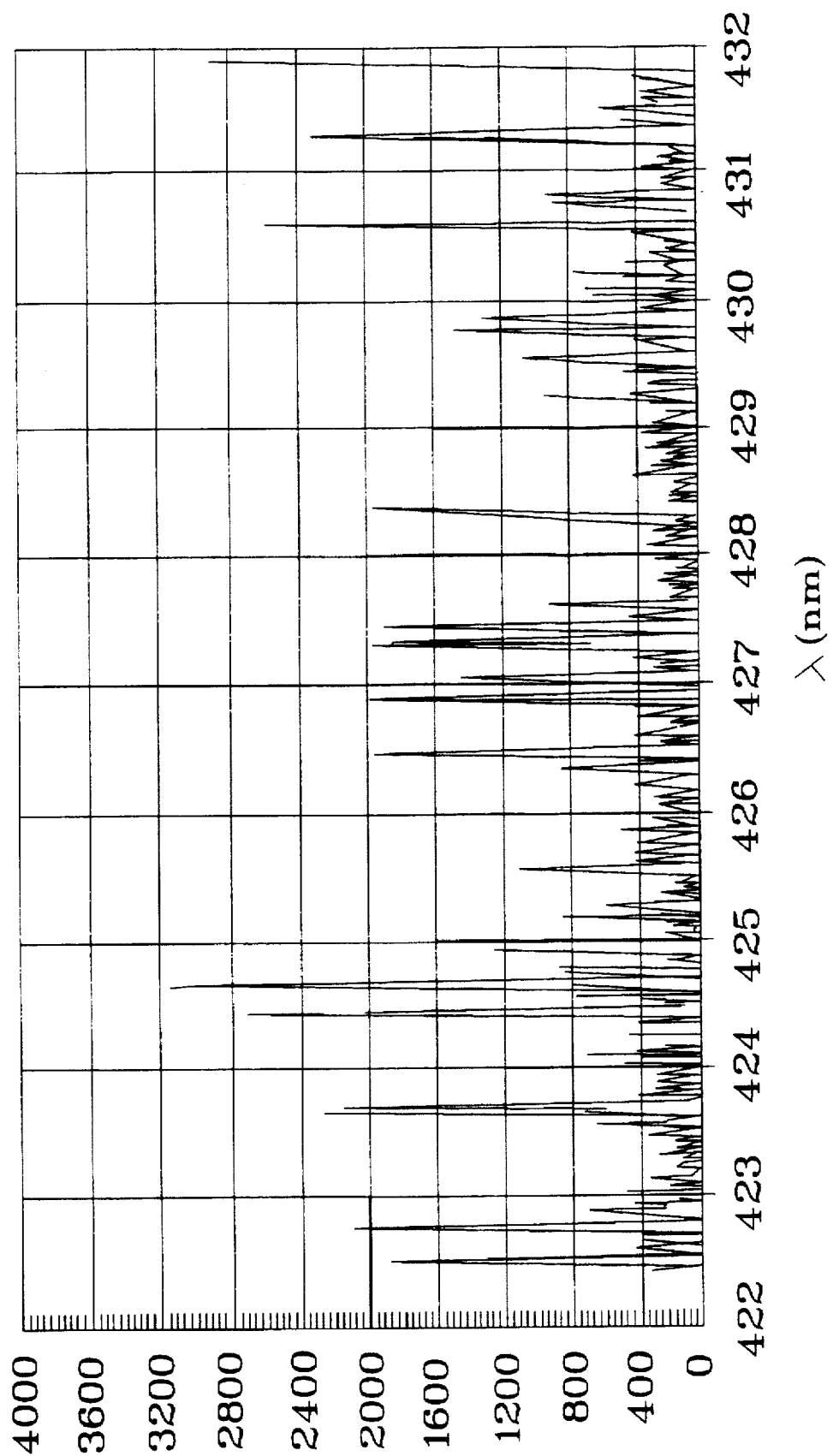
FIG. 4 is an example of a curve obtained from measurements taken with the device of the invention.
Figure 5:
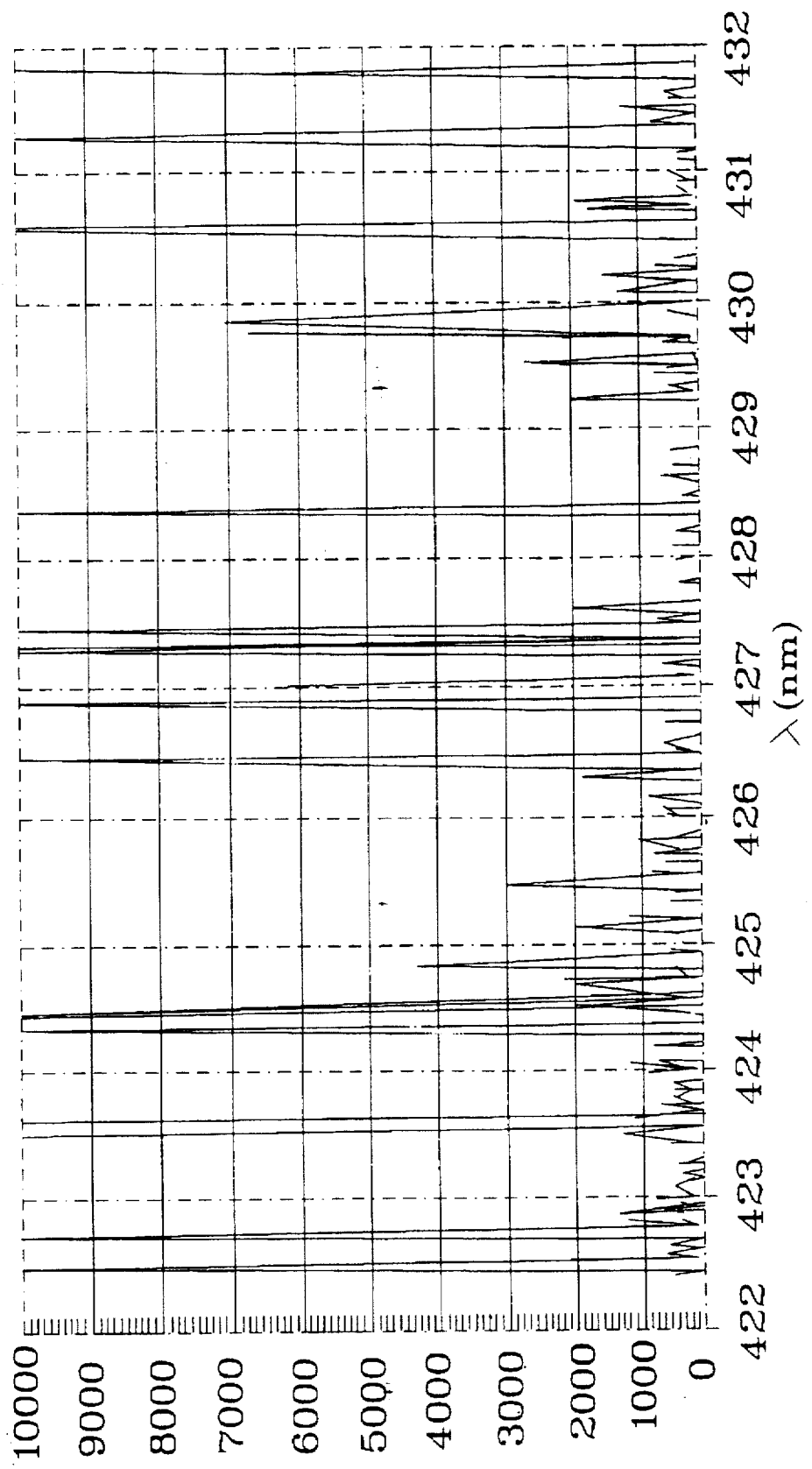
FIGS. 5 and 6 are Figures similar to those in FIG. 4 but produced using a device of the prior art with a high gain and low gain, respectively.
Figure 6:
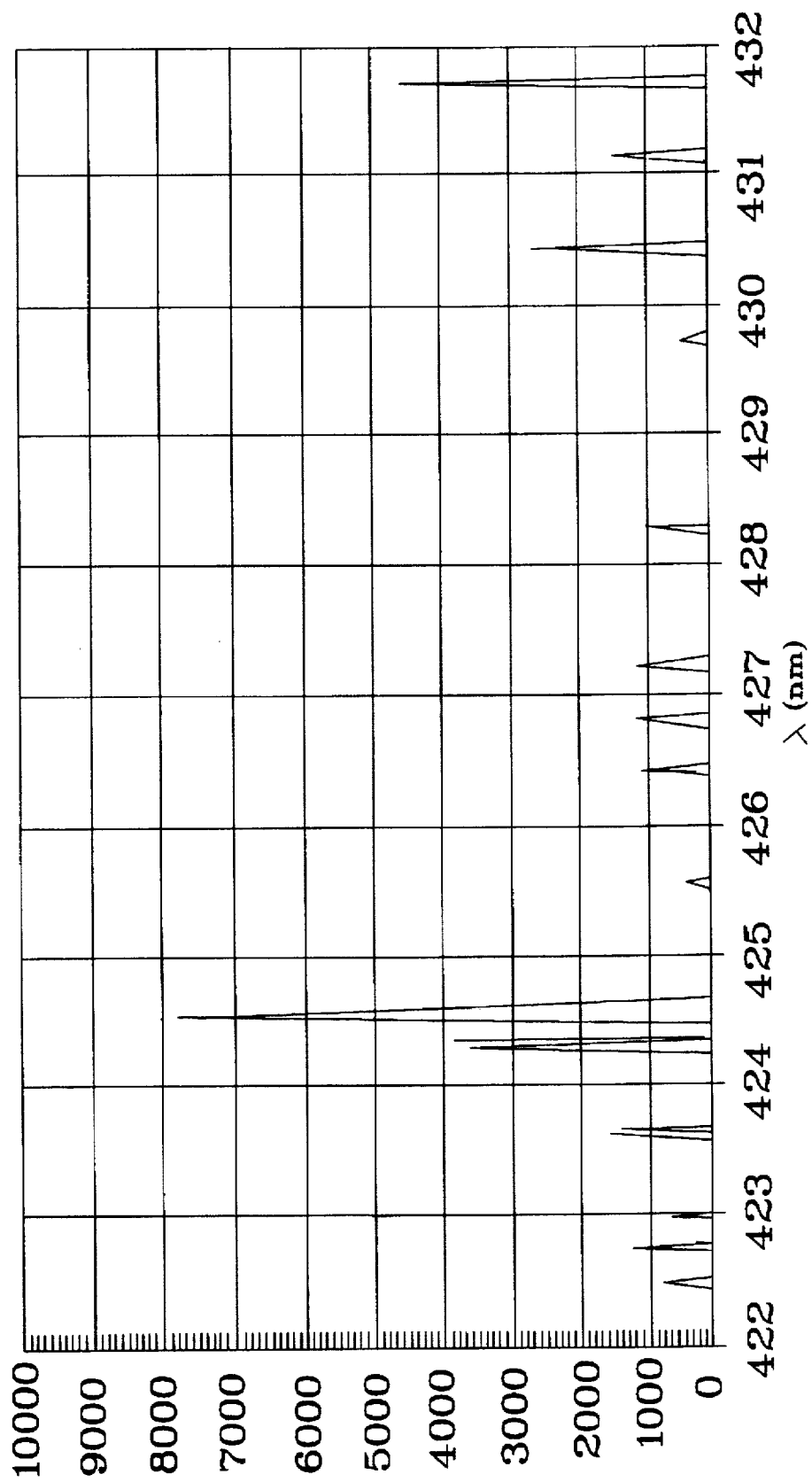

The large dynamic range of this device makes it particularly efficient for spectral analysis, where it allows acquisition of the whole elementary spectrum of a sample analyzed for example by spectrometric emission. FIGS. 4, 5 and 6 show, respectively, a spectrum obtained according to the invention, and a spectrum obtained at constant high gain and low gain from the same sample, the low gain being chosen as necessary in order to make the particularly strong lines appear. In these figures, wavelength X is represented along the x-axis and the intensity of the signal along the y-axis.

The variable gain luminous flux measuring device is ideal for eliminating the photomultiplier's inherent noise which affects measurements.

Indeed, it provides a means of separating parasitic pulses which can then be recognized and eliminated by data processing effected by the computer.

When performing layer analyses at very high speeds, several optical channels perceive the quantity of light at a given wavelength representative of an element.

The concentrations of different elements can vary widely from 100% to one part per million, representing a variation of $10^6$, and therefore a variation of the same amplitude as the received signal.

The usual dynamic range of photomultipliers does not allow all these concentrations to be measured and, since the analysis is destructive, starting over again with different gain levels is out of the question.

The device of the invention overcomes these drawbacks.

Moreover, instruments offering "simultaneous scanning" are now available in which several optical channels are distributed along the spectrum. Each channel can scan a portion of the spectrum and the total spectrum can cover all or part of the total spectrum of the instrument.

The relative intensity of the spectral lines is very different for equivalent percentages of the elements making up the matrix, or even for the same element. The sensitivity of an optical channel can be too high or too low for it to be rationally used for the different elements met in the form of separate wavelengths during scanning.

Here again, the large dynamic range of the luminous flux measuring device makes it possible to overcome this drawback.

What is claimed:

1. A luminous flux measuring device to provide a flux measurement, said device comprising:
    a) a gain controllable photoreceiver to receive a luminous flux to be measured and to output an electrical flux measurement signal;
    b) measurement means for recording and evaluating the electrical flux measurement signal supplied by the photoreceiver and for producing the measurement sought;
    c) a gain control circuit providing a gain control signal for controlling the gain of the photoreceiver;
    d) a gain slaving circuit to output a gain control slave signal to the gain control circuit, said gain slaving circuit including:
        i) a slave memory containing characteristic values of a continuous gain control function f(m);
        ii) a comparator connected to receive the electrical flux measurement signal from the photoreceiver, to receive the gain control signal from the gain control circuit and to receive the gain control function characteristic values from the slave memory, said comparator being operative to compare the received gain control signal with a computed gain control signal derived from said continuous function characteristic values and to generate the gain control slave signal;
    wherein said gain control slave signal controls the gain control signal to have said continuous gain control function f(m) of the electrical flux measurement signal (m) produced by the photoreceiver, so that the gain of the photoreceiver is a continuous transfer function of the electrical flux measurement signal (m) produced by the photoreceiver, the transfer function being determined in accordance with said continuous gain control function.

2. A luminous flux measuring device according to claim 1 wherein the gain control circuit comprises an analog circuit.

3. A luminous flux measuring device according to claim 1 wherein the gain slaving circuit is at least partially digital.

4. A luminous flux measuring device according to claim 1 wherein the photoreceiver outputs an electric current(s) and comprises a current-voltage converter to receive the electric current(s) from the photoreceiver and output a voltage comprising the electrical flux measurement signal (m) to the gain slaving circuit.

5. A luminous flux measuring device according to claim 1 wherein the gain control function is determined by multiple parameters and the slave memory comprises multiple potentiometers each respectively determining the value of one of said multiple parameters.

6. A luminous flux measuring device according to claim 1 wherein the gain control function f(m) is a non-linear function.

7. A luminous flux measuring device according to claim 1 wherein the comparator comprises an amplifier configured as a differential amplifier.

8. A luminous flux measuring device according to claim 1 wherein the comparator comprises an amplifier configured as a summing amplifier.

9. A luminous flux measuring device according to claim 1 wherein the gain control circuit comprises a ballast transistor controlled by a transistor configured as a voltage generator.

10. A luminous flux measuring device according to claim 1 wherein the gain control circuit comprises switched circuits.

11. A luminous flux measuring device according to claim 1 wherein the photoreceiver is a photomultiplier having a gain controlled by the value of said gain control signal.

12. A luminous flux measuring device according to claim 11 wherein said gain control signal has a high voltage HT, the photomultiplier comprises n dynodes and the gain of the photomultiplier is given by $G=HT^{cn}$, where c is a specific coefficient of the photomultiplier, so that said transfer function equals: $(f(m))^{cn}$.

13. A luminous flux measuring device according to claim 1 wherein the gain control function f(m) is a linear function (a×m+b) of the signal (m) produced by the photoreceiver, wherein (a) and (b) are constants.

14. A luminous flux measuring device according to claim 13 wherein the slave memory comprises two user settable potentiometers respectively to determine the values the parameters (a) and (b) of the linear gain control function f(m).

15. A luminous flux measuring device to provide a flux measurement, said device comprising:
    a) a gain controllable photoreceiver to receive a luminous flux to be measured and to output an electrical flux measurement signal, said gain controllable photoreceiver comprising
        i) a photomultiplier outputting an electric flux measurement current (s) and having a gain controlled by the level of an applied high voltage;
        ii) a current-voltage converter to receive the electric current (s) from the photoreceiver and output a voltage comprising the electrical flux measurement signal (m);
    b) measurement means for recording and evaluating the electrical flux measurement signal supplied by the photoreceiver and for producing the measurement sought;
    c) a gain control circuit providing a gain control signal for controlling the gain of the photoreceiver;
    d) a gain slaving circuit to output a gain control slave signal to the gain control circuit, said gain slaving circuit including:

i) a slave memory containing characteristic values of a continuous gain control function f(m);

ii) a comparator connected to receive the electrical flux measurement signal from the photoreceiver, to receive the gain control signal from the gain control circuit and to receive the gain control function characteristic values from the slave memory, said comparator being operative to compare the received gain control signal with a computed gain control signal derived from said continuous function characteristic values and to generate the gain control slave signal;

wherein said gain control slave signal controls the gain control signal to have said continuous gain control function f(m) of the electrical flux measurement signal (m) produced by the photoreceiver, so that the gain (G) of the photoreceiver is a continuous transfer function of the electrical flux measurement signal (m) produced by the photoreceiver, the transfer function being determined in accordance with said continuous gain control function f(m), wherein the gain slaving circuit is at least partially digital, wherein the gain control function f(m) is a linear function (a×m+b) of the electrical flux measurement signal (m) produced by the photomultiplier, (a) and (b) being constants, wherein the comparator comprises an amplifier configured as a differential amplifier and wherein the gain control circuit comprises a ballast transistor controlled by a transistor configured as a voltage generator.

\* \* \* \* \*

UNITED STATES PATENT AND TRADEMARK OFFICE
CERTIFICATE OF CORRECTION

PATENT NO. : 5,726,438
DATED : March 10, 1998
INVENTOR(S) : Alain Le Marchand

It is certified that error appears in the above-identified patent and that said Letters Patent is hereby corrected as shown below:

Title page, item [19], Marchand should read --Le Marchand--.

Signed and Sealed this

Second Day of June, 1998

Attest:

BRUCE LEHMAN

*Attesting Officer*  *Commissioner of Patents and Trademarks*